US006958756B2

(12) United States Patent
Kitagawa et al.

(10) Patent No.: US 6,958,756 B2
(45) Date of Patent: Oct. 25, 2005

(54) IMAGE PROCESSING SYSTEM AND METHOD

(75) Inventors: Masahiko Kitagawa, Kusatsu (JP); Hiroki Nakano, Ohtsu (JP); Akira Yanagawa, Ohtsu (JP)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 10/378,433

(22) Filed: Mar. 3, 2003

(65) Prior Publication Data

US 2003/0169260 A1     Sep. 11, 2003

(30) Foreign Application Priority Data

Mar. 8, 2002   (JP) ............................ 2002-063781

(51) Int. Cl.[7] ............................................ G06F 15/16
(52) U.S. Cl. ..................... 345/502; 345/536; 345/505
(58) Field of Search ................................. 345/502, 506, 345/505, 536; 348/272, 274, 294; 700/4, 700/5; 382/282; 712/10, 11, 14, 16

(56) References Cited

U.S. PATENT DOCUMENTS 6,425,026 B1 * 7/2002 Morris et al. ............... 710/100
6,452,149 B1 * 9/2002 Yamashita et al. .......... 348/294

* cited by examiner

Primary Examiner—Matthew C. Bella
Assistant Examiner—Hau Nguyen
(74) Attorney, Agent, or Firm—Driggs Lucas Brubaker & Hogg Co. LPA

(57) ABSTRACT

An image processing system comprises a plurality of memories to which image data is input, a control circuit for selecting areas for image processing from the image data input to the memories, and a plurality of DSPs connected to the memories and performing image processing of the selected image data selected by the control circuit.

The present invention provides a an image processing system and method where selected image data including overlap areas can be sent from memories to DSPs by entering the same image data into a plurality of memories, without requiring transfers of overlap areas between DSPs, such that the image processing speed is improved.

17 Claims, 3 Drawing Sheets

IMAGE PROCESSING SYSTEM AND METHOD

BACKGROUND OF THE INVENTION

1. Field of the Invention

The present invention relates generally to an image processing system and method therefore, and more particularly to an image processing system and method where selected image data including overlap areas can be sent from memories to DSPs by entering the same image data into a plurality of memories, without requiring transfers of overlap areas between DSPs.

2. Description of Related Art

It is known that an image processing system 30 in FIG. 5 performs image processing of captured image data. The image data is captured using a line sensor 44. The line sensor 44 outputs the image data continuously. The image processing system 30 performs distributed and parallel processing of the image data using a plurality of digital signal processors (DSPs) $36_1$, $36_2$, $36_3$, and $36_m$. Note that a reference character n in FIG. 5 indicates the number of DSPs 36, where n is a positive integer. Furthermore, the reference numeral 36 includes reference numerals $36_1$ to $36_m$ in FIG. 5 and the specification. A reference numeral 46 includes reference numerals $46_1$ to $46_m$.

FIG. 6 shows the image data 38 input to the image processing system 30. In FIG. 6 and the specification, a reference numeral 40 includes reference numerals $40_1$ to $40_{n+1}$. A reference numeral 42 includes reference numerals $42_1$ to $42_{n+1}$. The image data 38 is input to a first-in first-out (FIFO) memory 32 in units of one line and distributed to DSPs 36 in units of a given number of lines. In the distribution method, the image data 38 is divided in units of data areas each having a given size and the divided image data 40 of the data areas are distributed to the DSPs 36. For example, the image data $40_1$ is sent to a first DSP $36_1$. Upon receiving the image data 40, each DSP 36 stores the image data 40 into a memory 46 connected to the DSP 36 and performs predetermined image processing for the image data 40.

The image processing system 30 needs to receive the image data 38 continuously without missing any data. Additionally, an overlap area 42 is needed for the plurality of DSPs 36 to divide and process the continuous image data 38. For example, an overlap area $42_1$ is to be transferred from the image data $40_1$ in the first DSP $36_1$ to the second DSP $36_2$.

The following describes a reason for transferring the overlap area 42 to the next DSP. Image data fetched once does not remain in the FIFO memory 32. In other words, when the image data $40_1$ is assigned to the first DSP $36_1$ from the FIFO memory 32 and then the image data $40_2$ is to be assigned to the second DSP $36_2$ from the FIFO memory 32, the overlap area $42_1$ does not remain in the FIFO memory 32. Therefore, the overlap area $42_1$ is transferred through an image transfer between the first and second DSPs $36_1$ and $36_2$. For example, as shown in FIG. 6, the overlap area $42_1$ is assumed to be an area of line 980 to line 1000 in the image data $40_1$ input to the first DSP $36_1$. The overlap area $42_1$ is transferred to the second DSP $36_2$ before an execution of image processing in the first DSP $36_1$.

The system, however, requires that the image data transfer between individual DSPs 36 be of a period of time in milliseconds and the DSP 36 is unable to start image processing until the transfer is complete. If the overlap area 42 is large, the transfer requires a lot of time, thereby making the above problem more serious.

As the overlap area 42 gets larger, time required for the transfer increases, resulting in an increase of the latency up to the instant at which the DSPs 36 start image processing. Therefore, the system 30 has less desirable performance in terms of image processing per unit time and therefore needs to have additional DSPs 36 for the latency. The need has thus long persisted for to overcome these unresolved problems and deficiencies by the invention described below.

SUMMARY OF THE INVENTION

According to the present invention, selected image data including overlap areas can be sent from memories to DSPs by entering the same image data into a plurality of memories. The overlap areas need not be transferred between the DSPs, and the DSPs can start image processing immediately after receiving the selected image data. Therefore, while the system of the present invention may have the same number of DSPs as those of the conventional system, the image processing speed is improved. A larger overlap area does not decrease the image processing speed of the entire system. Furthermore, since the system eliminates latency required for the DSPs to acquire overlap areas, the number of DSPs can be decreased if the same image processing speed is applied to the present invention and the conventional system.

According to a first aspect of the present invention, there is provided an image processing method, comprising the steps of inputting the same image data into a plurality of memories, selecting areas for image processing from the input image data, and performing image processing of the selected image data in the areas selected in the selection step with processing means.

According to another aspect of the present invention, there is provided an image processing system, comprising a plurality of memories to which image data is input, a control circuit for selecting an area for image processing from the image data input to the memories, and a plurality of processing means for performing the image processing of the selected image data in the areas selected by the control circuit with being connected to the memories.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
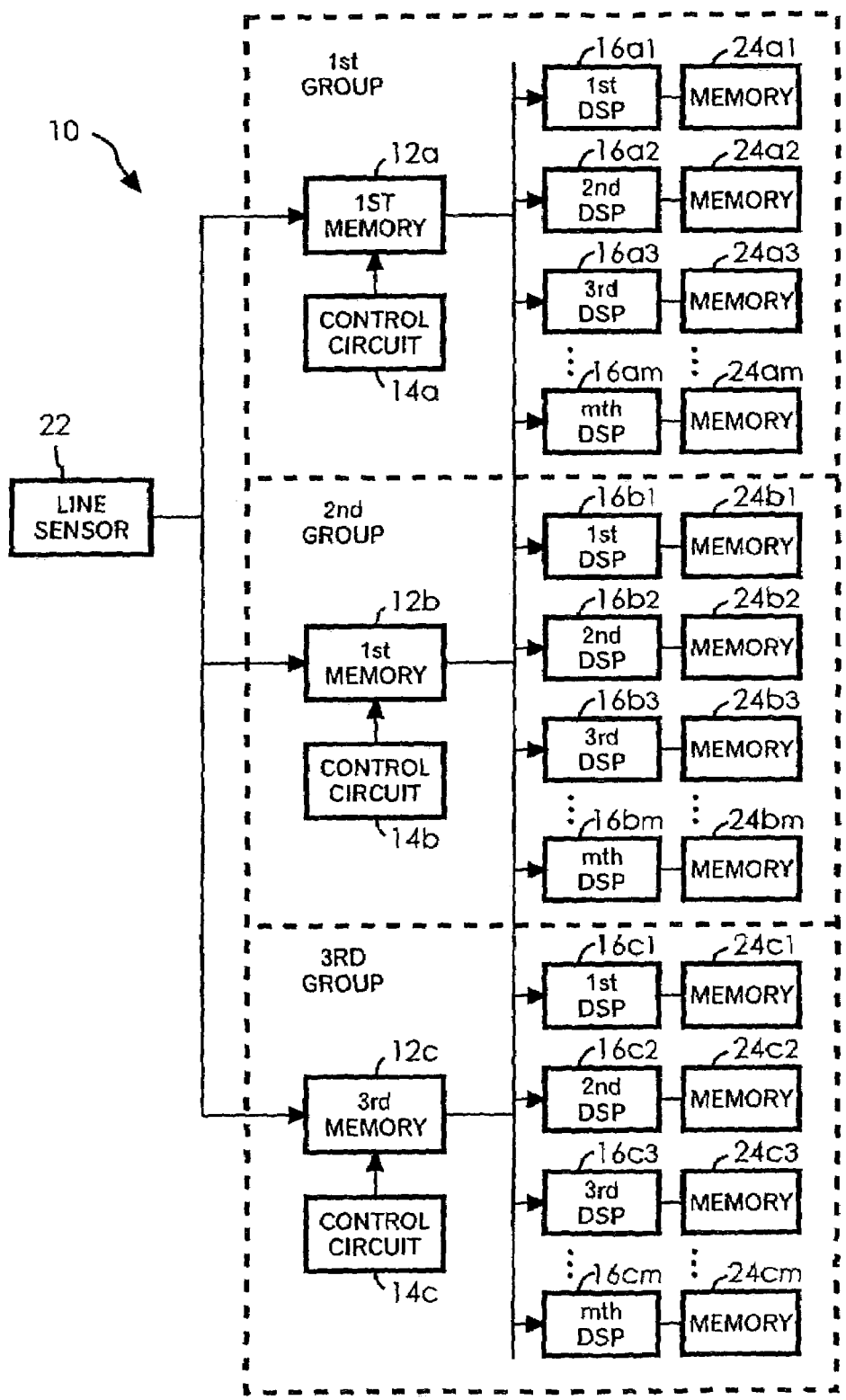
FIG. 1 is a diagram showing a configuration of an image processing system according to an embodiment of the present invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

An image processing method and a system therefor according to the present invention will now be described hereinafter with reference to the accompanying drawings. Note that a reference numeral 12 includes 12a, 12b, and 12c in the drawings and the specification. A reference numeral 14 includes reference numerals 14a, 14b, and 14c. A reference numeral 16 includes reference numerals $16_{a1}$ to $16_{am}$, $16_{b1}$ to $16_{bm}$, and $16_{c1}$ to $16_{cm}$. A reference numeral 20 includes reference numerals $20_1$ to $20_7$. A reference numeral 21 includes reference numerals $21_1$ to $21_6$. A reference numeral 24 includes reference numerals $24_{a1}$ to $24_{am}$, $24_{b1}$ to $24_{bm}$, and $24_{c1}$ to $24_{cm}$.

Figure 2:
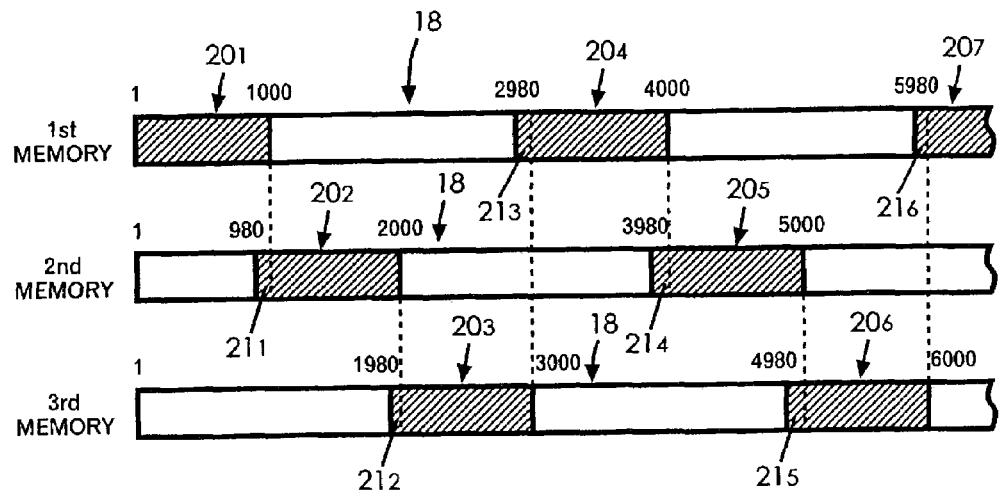
FIG. 2 is a diagram showing a selection of selected image data from image data in respective memories.

As shown in FIG. 1, an image processing system 10 comprises a plurality of memories 12 to which image data 18 in FIG. 2 is input, a control circuit 14 selecting an area for image processing from the image data 18 input to the memories 12, and a plurality of DSPs (digital signal processors) 16 connected to the memories 12 to perform image processing of the selected image data in the area selected by the control circuit 14. The memories 12 and the plurality of DSPs 16 connected to the memories 12 are put together into one group. For example, three groups are assumed as shown.

The system 10 includes a line sensor 22. In other words, the system 10 uses a plurality of solid-state image sensing devices such as charge coupled devices (CCDs) or complementary metal-oxide semiconductors (CMOSs) arranged in a line to capture the image data 18. The image data 18 is captured in units of single-line data including a plurality of pixels by the line sensor 22.

The memory 12 is a first-in first-out (FIFO) memory. The image data 18 is input to the memories 12 in units of a line and sequentially fetched from the memories 12 in order in units of a line. The same image data 18 is input to the respective memories 12.

The area for performing image processing from the above image data 18 consists of a plurality of consecutive lines in the image data 18.

Each of the memories 12 is provided with a control circuit 14. In other words, each group has one control circuit 14. As shown in FIG. 2, the control circuit 14 selects image data 20 for an area to perform image processing from the image data 18 input to the memory 12. The selected image data 20 is assumed selected image data 20 intended for image processing executed by the DSP 16 within the group. The selected image data 20 selected for the image processing is sent to the DSP 16 by means of a direct memory access (DMA).

In the image data 18 input to each memory 12, image data in areas other than those of the selected image data 20 is deleted by the control circuit 14 after its output from the memory 12.

The selected image data 20 selected from the image data 18 differs from each other in the plurality of memories 12. For example, the same data 18 is input to the respective memories 12 as shown in FIG. 2. A 128-pixel width is assumed. The pixel width represents the number of CCDs arranged in the line sensor and a single line contains 128 pixels. A figure in FIG. 2 indicates a line number. For the first memory 12a, an area of line 1 to line 1000 is assumed to be selected image data $20_1$. For the second memory 12b, an area of line 980 to line 2000 is assumed to be selected image data $20_2$. For the third memory 12c, an area of line 1980 to line 2000 is assumed to be selected image data $20_3$. In this manner, the image data 18 in each memory 12 has selected image data 20 whose line area varies with the memory.

Figure 6:
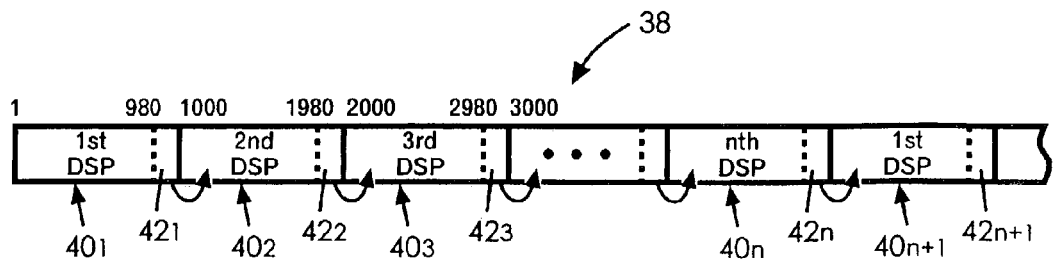
FIG. 6 is a diagram showing transfers of overlap areas between selected image data.

As described above, two pieces of selected image data $20_1$ and $20_2$ acquired from the first and second memories 12a and 12b have an overlap of an area $21_1$ in line 980 to line 1000. In the selected image data $20_2$ acquired from the second memory 12b, the area $21_1$ overlapping with the selected image data $20_1$ acquired from the first memory 12a corresponds to an overlap area $42_1$ in the conventional art shown in FIG. 6. The second and third memories 12b and 12c also have an overlap of an area $21_2$ in line 1980 to line 2000 and the area $21_2$ corresponds to the overlap area $42_2$ in FIG. 6.

The selected image data 20 varies with each memory 12 and there is created an area 21 overlapping between certain selected image data 20 and selected image data 20 acquired from the image data 18 of another memory 12. Therefore, the selected image data 20 equals image data having the image data 40 and the overlap area 42 in the conventional art. The selected image data 20 having the overlap area can be sent from the memory 12 directly to the DSP 16, by which the overlap area need not be transferred between DSPs 16. Note that the first selected image data $20_1$ has no overlapping area 21.

In each group, the selected image data $20_1$, $20_2$, and $20_3$ are sent from the memories 12a, 12b, and 12c to the first DSPs $16_{a1}$, $16_{b1}$, and $16_{c1}$, and then the next selected image data $20_4$, $20_5$, and $20_6$ are sent to the second DSPs $16_{a2}$, $16_{b2}$, and $16_{c2}$.

Although the area intended for image processing depends upon image data 18 input to each memory 12, the respective control circuits 14 complete the image processing of all areas for the image data 18 without missing any line.

The same number of DSPs 16 are connected to each memory 12. In FIG. 1, reference character m indicates the number of DSPs 16 in each group where m is a positive integer. With keeping the same number of DSPs 16, image processing can be equally performed in the respective groups.

The total number of DSPs 16 in the system 10 is the number of DSPs 16 that enables DSPs 16 having first received the selected image data 20 to complete the image processing when the selected image data 20 is sent to all the DSPs 16. In other words, after the selected image data 20 is sent to all the DSPs 16, the DSPs 16 having first received the selected image data 20 have already completed the image processing and can receive new selected image data 20.

Therefore, the system 10 can perform image processing of the image data 18 captured by the CCDs in sequence.

The total number of DSPs 16 in each group is the number of DSPs that enables a DSP 16 having first received selected image data 20 to complete the image processing when the selected image data 20 is sent to all the DSPs 16 in the group. In each group, the DSP 16 having completed the image processing can receive new selected image data 20 and perform image processing continuously.

A memory 24 for storing selected image data 20 is connected to each DSP 16 or arranged inside. The DSP 16 starts image processing after storing the selected image data 20 in the memory 24.

The system 10 includes a PCI interface for controlling a connection with a peripheral component interconnect bus (PCI BUS) to transfer data having undergone image processing in the DSP 16 to another device.

The following describes an image processing method. The line sensor 22 captures desired image data 18 in units of one line. If the number of CCDs or CMOSs in the line sensor 22 equals 128 pixels, 128-pixel data is captured as a line continuously. The image data 18 is input to each memory 12 as soon as it is captured.

For the image data 18 input to the memory 12, the control circuit 14 selects an area for image processing. The area is selected in such a way that it varies with the image data 18 input to each memory 12. For example, as shown in FIG. 2, an area of line 1 to line 1000 is selected for image data 18 in the first memory 12a, an area of line 980 to line 2000 is selected for image data 18 in the second memory 12b, and an area of line 1980 to line 3000 is selected for image data 18 in the third memory 12c.

Furthermore, areas for two pieces (i.e., portions) of selected image data 20 such as, for example, selected image data $20_1$ and $20_2$ selected from the image data 18 of the first memory 12a and the second memory 12b are selected so that they overlap each other in the area of line 980 to line 1000. It is because the overlapping area $21_1$ corresponds to the overlap area $42_1$ in the conventional art in the selected image data $20_2$.

Figure 3:
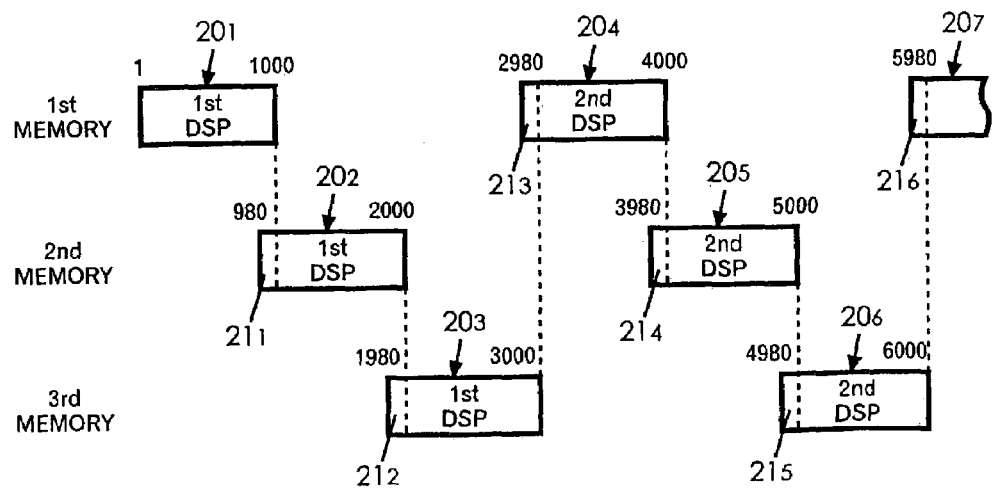
FIG. 3 is a diagram showing DSPs for performing processing of the selected image data in respective groups.

The selected image data 20 in the area selected by the control circuit 14 is sent to a DSP 16 in the group as shown in FIG. 3. In the respective groups, the first DSPs $16_{a1}$, $16_{b1}$, and $16_{c1}$, receive the selected image data 20 in order, first. Note that figures in FIG. 3 indicate line numbers. In the image data 18 input to each memory 12, areas not selected are deleted.

As shown in FIGS. 2 and 3, the selected image data 20 selected in each memory 12 differs from one memory to another, by which each selected image data 20 different from others is sent from each memory 12 to the DSP 16 connected to the memory 12. Therefore, each DSP 16 processes the selected image data 20 different from others. Each memory 12 selects the selected image data 20 in such a way that all the areas in the image data 18 undergo the image processing.

Upon receiving the selected image data 20, each DSP 16 stores the selected image data 20 to the memory 24 connected to the DSP 16 and performs predetermined image processing. After a completion of the image processing, the system transmits the processing result from the PCI interface to another device via the PCI bus. Otherwise, the selected image data 20 completed in the image processing is transferred from the PCI interface to another device via the PCI bus.

When the selected image data 20 is sent to all the DSPs 16 in the system 10, the image processing terminates in the DSPs 16 having first received the selected image data 20. Since the image processing in the first DSPs 16 is terminated, the DSPs 16 can receive new selected image data 20.

In this manner the DSPs 16 having terminated the image processing receive the new selected image data 20, thereby enabling continuous image processing of the image data 18 captured by the CCDs or CMOSs.

As set forth hereinabove, the present invention does not require a transfer of an overlap area between DSPs 16 and the present invention enables image processing to be initiated immediately after the DSPs 16 receive the selected image data 20. Therefore, the image processing speed is improved in the entire system on condition that the number of DSPs is identical when compared with the conventional system.

In addition, the DSPs 16 starts image processing immediately after receiving the selected image data 20, thereby eliminating latency for image processing in the DSPs 16. If the system 10 of the present invention has the same image processing speed as in the conventional system 30, the number of DSPs 16 can be reduced for the eliminated latency of the DSPs 16 relative to the number of DSPs 36 in the conventional system.

Figure 4:
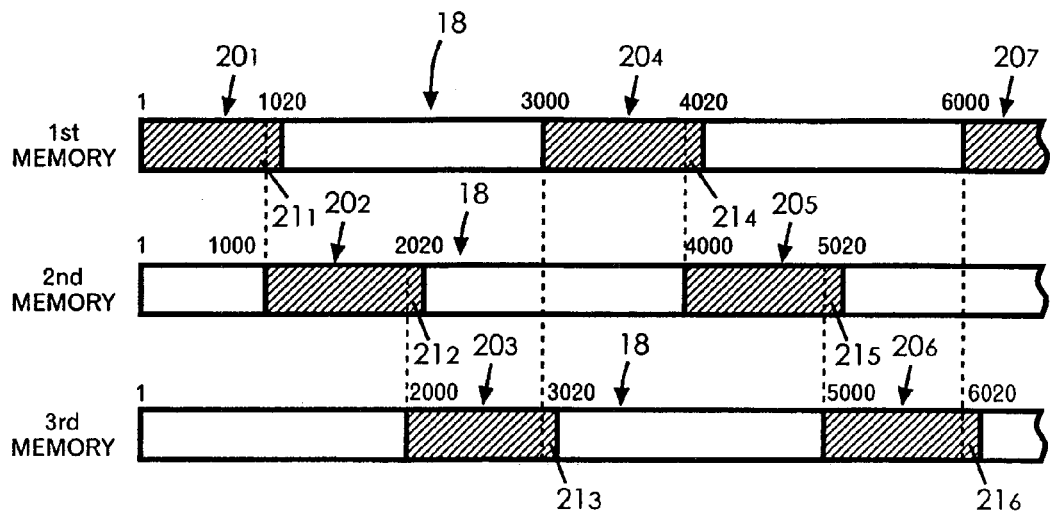
FIG. 4 is a diagram showing another example of selecting selected image data from the image data in the respective memories.
Figure 5:
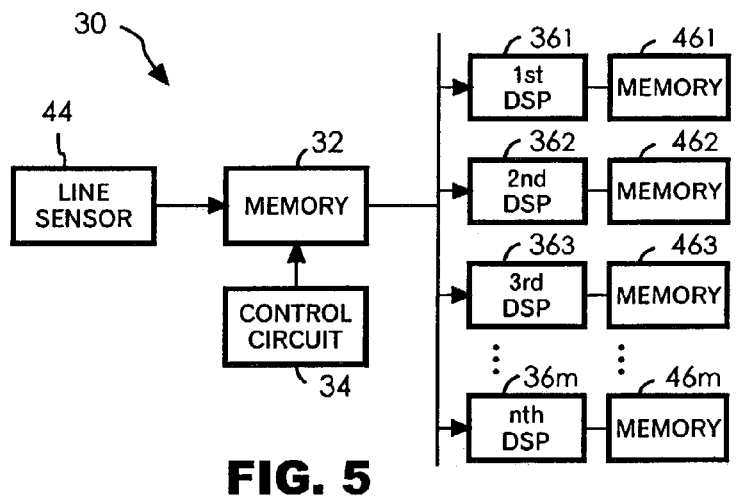
FIG. 5 is a diagram showing a configuration of a conventional image processing system.

While the image processing method and the system therefor of the present invention have been described hereinabove, the present invention is not limited to the above method and system. For example, as shown in FIG. 4, the position of the overlapping area 21 can be altered. The overlapping area 21 is arranged at the end of each selected image data 20. Here as the above embodiments, each DSP 16 can start image processing immediately after receiving the selected image data 20, too. Note that, however, the last selected image data 20 has no overlapping area 21.

Furthermore, a device having two-dimensionally arranged CCDs can be used instead of a line sensor. Even if the image data is imported by the two-dimensionally arranged CCDs, the same image data is input to a plurality of memories in the same manner as in the above embodiments. By selecting the image data input to the memories so that an area for the image data depends upon each memory, image processing can be performed in the same manner as for the above embodiments.

An amount of data of the overlapping area 21 can be altered according to the image processing performed by each DSP 16. Particularly if the captured image data 18 has a lot of repetitive areas, the amount of data in the overlapping area 21 is increased. For example, if the system 10 is used for an automatic check of memories, the overlap area is of approx. 500 lines where the number of lines for the selected image data 20 is 1000. Even if the overlapping area 21 is larger, the image processing speed will never be lower since there is no transfer of the overlapping area 21 between DSPs 16.

Furthermore, it is also possible to alter the data amount of the selected image data 20 by altering the amount of image processing performed by the DSPs 16.

Although three groups are used in FIG. 1, the number of groups can be some other positive integer only if it is plural.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An image processing method comprising the steps of:
inputting identical image data into a plurality of memories;
selecting areas for image processing from said input image data; and
performing image processing of each of the selected image data individually in the areas selected in said selection step with individual processors for each selected image data, and wherein said selection step further comprises a step of arranging said areas so as to vary with each image data input to said plurality of memories.

2. The method according to claim 1, wherein said selection step further comprises a step of creating overlapping areas between two said areas.

3. The method according to claim 2, further comprising a step of deleting data other than said selected image data in said image data.

4. The method according to claim 1, further comprising a step of capturing said image data using a solid-state image sensing device.

5. The method according to claim 2, further comprising a step of capturing said image data using a solid-state image sensing device.

6. An image processing system, comprising:
a plurality of memories to which identical image data is input;
a control circuit for selecting areas for image processing from the image data input to said memories;
a plurality of processors connected to said memories, each for image processing of selected image data in areas selected by said control circuit.

7. The system according to claim 6, wherein said selected image data selected from said image data varies with each of said plurality of memories.

8. The system according to claim 7, having areas overlapping between two pieces of said selected image data.

9. The system according to claim 8, wherein the same number of said processors are connected to each of said memories.

10. The system according to claim 9, wherein said control circuit is set up in each of said memories.

11. The system according to claim 10, wherein said memories are FIFO memories.

12. The system according to claim 11, further comprising a solid-state image sensing device for capturing said image data.

13. An image processing system, comprising:
at least two memories to which identical image data is input;
a control circuit operable with at least one of said at least two memories for selecting areas for image processing from the image data input to said memories;
a plurality of processors connected to said memories individually for image processing of varied image data selected from said image data in areas selected by said control circuit, wherein said varied image data varies with each of said at least two memories;
wherein at least one overlapping area exists between two portions of said selected image data.

14. The system according to claim 13, wherein said at least two memories are FIFO memories.

15. The system according to claim 14, further comprising a solid-state image sensing device for capturing said image data.

16. The system according to claim 13, further comprising a solid-state image sensing device for capturing said image data.

17. The system according to claim 13, wherein said control circuit is operable with two FIFO memories.

* * * * *